May 23, 1961   L. B. CABLE, JR., ET AL   2,985,467
FLEXIBLE PIPE COUPLING
Filed Jan. 15, 1958
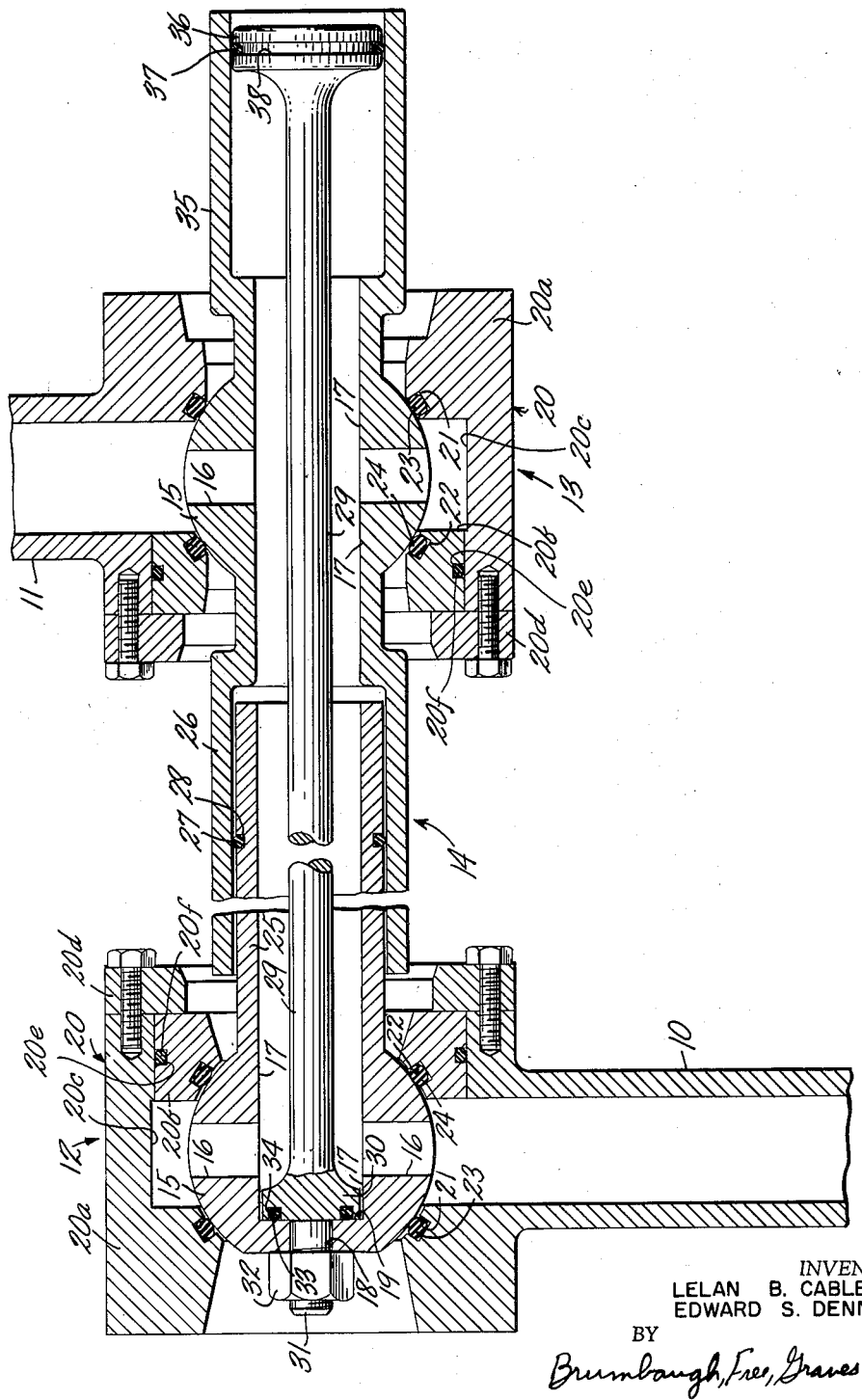
INVENTORS.
LELAN B. CABLE, JR. &
EDWARD S. DENNISON
BY
*Brumbaugh, Free, Graves + Donohue*
their ATTORNEYS.

United States Patent Office 2,985,467
Patented May 23, 1961

2,985,467
FLEXIBLE PIPE COUPLING
Lelan B. Cable, Jr., New London, and Edward S. Dennison, Waterford, Conn., assignors to General Dynamics Corporation, New York, N.Y., a corporation of Delaware
Filed Jan. 15, 1958, Ser. No. 709,133
1 Claim. (Cl. 285—165)

This invention relates to couplings between fluid conducting pipes and, more particularly, to hydrostatically balanced flexible couplings facilitating transmission of high pressure fluids between relatively movable pipes.

Fluid transmission systems frequently require flexible pipe couplings to absorb relative movement between cooperating pipes. For example, hydraulic units operating under high fluid pressure must often be shock mounted. To accommodate movement of the machine, flexible pipe couplings are interposed in the high pressure hydraulic lines. Those couplings previously used were often unduly complex and cumbersome, particularly if hydrostatically balanced, a necessity if relatively free movement under high pressure conditions were required.

The present invention provides a flexible pipe coupling incorporating a slip joint terminated by ball joints, the entire assembly being hydrostatically balanced to afford free movement between a pair of fluid conducting pipes under a wide range of pressure conditions.

A feature of the invention resides in the provision of a hydrostatically balanced slip joint disposed between fluid inlet and outlet members. A relatively small diameter rod fastened to one of the inlet and outlet members extends through the other member and terminates in a pipe section to balance the slip joint effectively.

These and further advantages of the present invention will be more readily understood when the following description is read in connection with the accompanying drawing, which shows a longitudinal section of a flexible pipe coupling embodying the principles of the invention.

Referring to a typical embodiment of the invention in greater detail with particular reference to the drawing, a pair of relatively movable pipes 10 and 11 conduct fluid to and from inlet and outlet devices such as ball joints 12 and 13, respectively. The joint 12 is formed of a ball 15 that has been hollowed out to provide a plurality of radial passages 16 and a larger passage 17 perpendicular thereto. A reduced diameter passage 18 terminates the passage 17 and forms a shoulder 19 at their juncture.

A socket 20, surrounding the ball 15, is formed in two sections 20a and 20b to provide access to the ball 15. The main section 20a and annular section 20b when assembled on the ball 15 form a fluid passage 20c, those sections being retained in position by a ring 20d. An annular groove 20e in the section 20b receives an O-ring 20f to seal the sections 20b and 20c.

To complete the ball joints 12 and 13, channels 21 and 22 respectively cut in the socket sections 20a and 20b receive O-rings 23 and 24 sealing the ball and socket joints. With that arrangement, it is apparent that the socket 20 may be rotated relative to the ball 15 and also moved through a substantial angle with respect to the axis of such rotation. Hydrostatic balance of the ball joints is afforded by the use of O-ring seals 23 and 24 of equal diameter and in parallel planes. Moreover, the passages in the ball 15 and socket 20 are symmetrical and arranged to provide hydrostatic balance between the relatively movable elements.

A pair of telescoping pipe sections 25 and 26, connected by welding or otherwise (not shown) to the balls 15, form the slip joint 14 between the joints 12 and 13. An O-ring 27 positioned in a groove 28 in the pipe section 25 effectively seals the joint 14.

Fluid pressure transmitted to the flexible coupling from the pipes 10 and 11 tends to force the slip joint 14 apart. To overcome those forces and balance the coupling, a relatively small diameter balancing rod 29 is formed with a head 30 abutting the ball shoulder 19. A short threaded rod 31 extends from the head 30 through the passage 18, and a nut 32 on the rod 31 forces the head 30 against the shoulder 19, an O-ring 33 being provided in a groove 34 on the head 30 to seal the assembly.

The rod 29 passes through the slip joint 14 and the ball joint 13 into a further balancing pipe section 35, affixed by welding or otherwise (not shown) to the ball 15 in communication with the passage 17. A piston 36 terminates the rod 29 and is formed with an O-ring 37 disposed in a groove 38 to provide a sliding seal in the pipe section 35. The size of the pipe section 35 and piston 36 is selected to provide a hydrostatic pressure acting on the piston 36 that will be equal to the hydrostatic pressure urging the slip joint 14 apart. In the structure described herein, hydrostatic balance is effected by making the inside diameters of the pipes 26 and 35 equal. In that regard, it will be understood that the rod 29 may be fastened to any other part of the ball 15 or pipe section 25 than that shown, if desired, and the hydrostatic balance of the slip joint 14 would be unaffected.

Since the extent of movement of the slip joint 14 is limited only by the overlap of the pipe sections 25 and 26 and the length of the rod 29 and pipe section 35, any suitable range of relative lateral motion between the pipes 10 and 11 may be accommodated simply by elongating those elements.

The present invention provides a flexible pipe coupling incorporating a hydrostatically balanced slip joint of simple and rugged construction. Moreover, ball joints in the coupling attached to each end of the slip joints may be of normal size, inasmuch as only a small diameter rod extends therethrough to balance the coupling hydrostatically, in contrast to other slip joints in which an entire pipe section of the joint must be slidably carried in the ball joint.

It will be understood that the above-described embodiment of the invention is illustrative only and modifications thereof will occur to those skilled in the art. Therefore, the invention is not to be limited to the specific apparatus disclosed herein but is to be defined by the appended claim.

We claim:
A coupling to conduct fluid between two relatively movable pipes comprising a pair of ball joints each including a hollow ball member and a socket member, the pipes being respectively connected to the socket members, first and second telescopically related pipe sections respectively fastened to the ball members of the first and second joints, means fastening a balancing rod to one of the ball members, the rod extending through the other ball member, a balancing pipe section affixed to the other ball member and extending along the axis of the telescoped pipe sections from the other side of the other ball member, said balancing pipe section communicating with said telescoped pipe sections through the other ball member, and a piston on the free end of the rod, said balancing pipe section slidably receiving the piston to balance the coupling hydrostatically.

References Cited in the file of this patent

UNITED STATES PATENTS

| | | |
|---|---|---|
| 72,258 | Abbot | Dec. 17, 1867 |
| 853,974 | Hayden | May 21, 1907 |
| 1,219,849 | Norris | Mar. 20, 1917 |
| 2,455,334 | Hill | Nov. 30, 1948 |

FOREIGN PATENTS

| | | |
|---|---|---|
| 687,148 | France | Apr. 22, 1930 |
| 534,704 | Germany | Oct. 1, 1931 |